United States Patent
Etchegoyen

(10) Patent No.: US 8,726,407 B2
(45) Date of Patent: May 13, 2014

(54) AUTHENTICATION OF COMPUTING AND COMMUNICATIONS HARDWARE

(75) Inventor: Craig S. Etchegoyen, Plano, TX (US)

(73) Assignee: DeviceAuthority, Inc., Fremont, CA (US)

(*) Notice: Subject to any disclaimer, the term of this patent is extended or adjusted under 35 U.S.C. 154(b) by 128 days.

(21) Appl. No.: 12/903,946

(22) Filed: Oct. 13, 2010

(65) Prior Publication Data

US 2011/0093703 A1  Apr. 21, 2011

Related U.S. Application Data

(60) Provisional application No. 61/252,521, filed on Oct. 16, 2009.

(51) Int. Cl.
*H04L 9/32* (2006.01)
*G06F 21/57* (2013.01)
*G06F 21/73* (2013.01)
*G06F 21/88* (2013.01)

(52) U.S. Cl.
CPC ............... *G06F 21/57* (2013.01); *G06F 21/73* (2013.01); *G06F 21/88* (2013.01); *H04L 9/32* (2013.01)
USPC .................. 726/34; 726/16; 726/26; 726/29; 726/35; 713/176; 713/189; 713/193

(58) Field of Classification Search
USPC ............. 726/26, 16, 29, 34–35; 380/27, 230; 713/168, 189, 176, 193
See application file for complete search history.

(56) References Cited

U.S. PATENT DOCUMENTS 4,246,638 A    1/1981  Thomas
4,351,982 A    9/1982  Miller et al.
(Continued)

FOREIGN PATENT DOCUMENTS

AU    678985    6/1997
EP    1 096 406    5/2001
(Continued)

OTHER PUBLICATIONS

T. Kohno, A. Broido, and k. claffy,"Remote Physical Device Fingerprinting", IEEE Symposium on security and privacy, May 2005, journal Article.*

(Continued)

*Primary Examiner* — Venkat Perungavoor
*Assistant Examiner* — Amir Mehrmanesh
(74) *Attorney, Agent, or Firm* — Sean D. Burdick

(57) ABSTRACT

A method for authenticating a computing device or hardware component includes computer-implemented process steps for assigning a unique identifier to the hardware component, generating a baseline fingerprint for the hardware component using algorithm-processing characteristic configuration data determined from the hardware component as input, wherein the baseline fingerprint is capable of being regenerated from the hardware component so long as configuration of the hardware component is not changed, transmitting the identifier in association with the baseline fingerprint for storage in a computer-readable data structure, and generating a data signal, in response to a query comprising the assigned identifier, indicating whether the stored baseline fingerprint for the assigned identifier matches a second fingerprint regenerated from the hardware component at a time after the baseline fingerprint is generated.

17 Claims, 6 Drawing Sheets

(56) References Cited

U.S. PATENT DOCUMENTS

| | | | |
|---|---|---|---|
| 4,658,093 A | 4/1987 | Hellman | |
| 4,704,610 A | 11/1987 | Smith et al. | |
| 4,779,224 A | 10/1988 | Cargile | |
| 4,796,220 A | 1/1989 | Wolfe | |
| 4,891,503 A | 1/1990 | Jewell | |
| 4,956,863 A | 9/1990 | Goss | |
| 5,210,795 A | 5/1993 | Lipner et al. | |
| 5,235,642 A | 8/1993 | Wobber et al. | |
| 5,239,166 A | 8/1993 | Graves | |
| 5,241,594 A | 8/1993 | Kung | |
| 5,260,999 A * | 11/1993 | Wyman | 705/59 |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 6,009,401 A | 12/1999 | Horstmann | |
| 6,041,411 A * | 3/2000 | Wyatt | 726/29 |
| 6,044,471 A | 3/2000 | Colvin | |
| 6,148,407 A * | 11/2000 | Aucsmith | 726/16 |
| 6,158,005 A | 12/2000 | Bharathan et al. | |
| 6,167,517 A | 12/2000 | Gilchrist et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,608 B1 | 12/2001 | Stiles | |
| 6,330,670 B1 | 12/2001 | England et al. | |
| 6,418,472 B1 | 7/2002 | Mi et al. | |
| 6,449,645 B1 | 9/2002 | Nash | |
| 6,536,005 B1 | 3/2003 | Augarten | |
| 6,785,825 B2 | 8/2004 | Colvin | |
| 6,799,272 B1 | 9/2004 | Urata | |
| 6,826,690 B1 | 11/2004 | Hind et al. | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 6,981,145 B1 | 12/2005 | Calvez et al. | |
| 7,032,110 B1 | 4/2006 | Su et al. | |
| 7,069,440 B2 | 6/2006 | Aull | |
| 7,069,595 B2 | 6/2006 | Cogmigni et al. | |
| 7,082,535 B1 | 7/2006 | Norman et al. | |
| 7,083,090 B2 | 8/2006 | Zuili | |
| 7,085,741 B2 | 8/2006 | Lao et al. | |
| 7,100,195 B1 | 8/2006 | Underwood | |
| 7,178,025 B2 | 2/2007 | Scheidt et al. | |
| 7,181,615 B2 | 2/2007 | Fehr et al. | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,233,997 B1 | 6/2007 | Leveridge et al. | |
| 7,234,062 B2 | 6/2007 | Daum et al. | |
| 7,272,728 B2 | 9/2007 | Pierson et al. | |
| 7,305,562 B1 | 12/2007 | Bianco et al. | |
| 7,310,813 B2 | 12/2007 | Lin et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,418,665 B2 | 8/2008 | Savage | |
| 7,463,945 B2 | 12/2008 | Kiesel et al. | |
| 7,590,852 B2 | 9/2009 | Hatter et al. | |
| 7,644,442 B2 * | 1/2010 | Miller et al. | 726/26 |
| 7,653,899 B1 | 1/2010 | Lindahl et al. | |
| 7,836,121 B2 | 11/2010 | Elgressy et al. | |
| 8,171,287 B2 | 5/2012 | Villela | |
| 8,327,448 B2 | 12/2012 | Eldar et al. | |
| 8,484,705 B2 | 7/2013 | Hoppe et al. | |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0065097 A1 | 5/2002 | Brockenbrough et al. | |
| 2002/0082997 A1 | 6/2002 | Kobata et al. | |
| 2002/0091937 A1 | 7/2002 | Ortiz | |
| 2002/0161718 A1 | 10/2002 | Coley et al. | |
| 2002/0178366 A1 | 11/2002 | Ofir | |
| 2003/0001721 A1 | 1/2003 | Daum et al. | |
| 2003/0056107 A1 | 3/2003 | Cammack et al. | |
| 2003/0065918 A1 | 4/2003 | Willey | |
| 2003/0084306 A1 | 5/2003 | Abburi et al. | |
| 2003/0097331 A1 | 5/2003 | Cohen | |
| 2003/0120920 A1 | 6/2003 | Svensson | |
| 2003/0156719 A1 | 8/2003 | Cronce et al. | |
| 2003/0182428 A1 | 9/2003 | Li et al. | |
| 2004/0003228 A1 | 1/2004 | Fehr et al. | |
| 2004/0024860 A1 | 2/2004 | Sato et al. | |
| 2004/0026496 A1 | 2/2004 | Zuili | |
| 2004/0030912 A1 | 2/2004 | Merkle et al. | |
| 2004/0049685 A1 | 3/2004 | Jaloveczki | |
| 2004/0059929 A1 | 3/2004 | Rodgers et al. | |
| 2004/0059938 A1 * | 3/2004 | Hughes et al. | 713/200 |
| 2004/0083469 A1 | 4/2004 | Chen et al. | |
| 2004/0107360 A1 | 6/2004 | Herrmann et al. | |
| 2004/0117321 A1 | 6/2004 | Sancho | |
| 2004/0143746 A1 | 7/2004 | Ligeti et al. | |
| 2004/0148601 A1 * | 7/2004 | Kroening | 717/177 |
| 2004/0149820 A1 | 8/2004 | Zuili | |
| 2004/0152516 A1 | 8/2004 | Blatter et al. | |
| 2004/0172531 A1 | 9/2004 | Little et al. | |
| 2004/0172558 A1 | 9/2004 | Callahan et al. | |
| 2004/0177255 A1 * | 9/2004 | Hughes | 713/189 |
| 2004/0187018 A1 | 9/2004 | Owen et al. | |
| 2005/0018687 A1 | 1/2005 | Cutler | |
| 2005/0034115 A1 | 2/2005 | Carter et al. | |
| 2005/0108173 A1 | 5/2005 | Stefik et al. | |
| 2005/0138155 A1 | 6/2005 | Lewis | |
| 2005/0166263 A1 | 7/2005 | Nanopoulos et al. | |
| 2005/0172280 A1 | 8/2005 | Ziegler et al. | |
| 2005/0182732 A1 | 8/2005 | Miller et al. | |
| 2005/0268087 A1 | 12/2005 | Yasuda et al. | |
| 2006/0005237 A1 | 1/2006 | Kobata et al. | |
| 2006/0036466 A1 | 2/2006 | Baupin et al. | |
| 2006/0064756 A1 * | 3/2006 | Ebert | 726/26 |
| 2006/0072444 A1 | 4/2006 | Engel et al. | |
| 2006/0080534 A1 | 4/2006 | Yeap et al. | |
| 2006/0085310 A1 | 4/2006 | Mylet et al. | |
| 2006/0090070 A1 | 4/2006 | Bade et al. | |
| 2006/0095454 A1 | 5/2006 | Shankar et al. | |
| 2006/0115082 A1 | 6/2006 | Kevenaar et al. | |
| 2006/0156129 A1 | 7/2006 | Midgley et al. | |
| 2006/0161914 A1 | 7/2006 | Morrison et al. | |
| 2006/0168580 A1 | 7/2006 | Harada et al. | |
| 2006/0265337 A1 | 11/2006 | Wesinger, Jr. | |
| 2006/0265446 A1 | 11/2006 | Elgressy et al. | |
| 2006/0282660 A1 | 12/2006 | Varghese et al. | |
| 2007/0061566 A1 | 3/2007 | Bailey et al. | |
| 2007/0078785 A1 | 4/2007 | Bush et al. | |
| 2007/0113090 A1 | 5/2007 | Villela | |
| 2007/0124689 A1 | 5/2007 | Weksel | |
| 2007/0143408 A1 | 6/2007 | Daigle | |
| 2007/0143838 A1 | 6/2007 | Milligan et al. | |
| 2007/0168288 A1 | 7/2007 | Bozeman | |
| 2007/0174633 A1 | 7/2007 | Draper et al. | |
| 2007/0198422 A1 | 8/2007 | Prahlad et al. | |
| 2007/0203846 A1 | 8/2007 | Kavuri et al. | |
| 2007/0207780 A1 | 9/2007 | McLean | |
| 2007/0209064 A1 | 9/2007 | Qin et al. | |
| 2007/0219917 A1 | 9/2007 | Liu et al. | |
| 2007/0234409 A1 | 10/2007 | Eisen | |
| 2007/0239606 A1 | 10/2007 | Eisen | |
| 2007/0260883 A1 | 11/2007 | Giobbi et al. | |
| 2007/0282615 A1 | 12/2007 | Hamilton et al. | |
| 2008/0028455 A1 | 1/2008 | Hatter et al. | |
| 2008/0052775 A1 | 2/2008 | Sandhu et al. | |
| 2008/0065552 A1 | 3/2008 | Elezar et al. | |
| 2008/0086423 A1 | 4/2008 | Waites | |
| 2008/0104683 A1 | 5/2008 | Nagami et al. | |
| 2008/0120195 A1 | 5/2008 | Shakkarwar | |

(56) References Cited

U.S. PATENT DOCUMENTS

| | | |
|---|---|---|
| 2008/0120707 A1 | 5/2008 | Ramia |
| 2008/0147556 A1 | 6/2008 | Smith et al. |
| 2008/0152140 A1 | 6/2008 | Fascenda |
| 2008/0177997 A1 | 7/2008 | Morais et al. |
| 2008/0228578 A1 | 9/2008 | Mashinsky |
| 2008/0242405 A1 | 10/2008 | Chen et al. |
| 2008/0261562 A1 | 10/2008 | Jwa et al. |
| 2008/0268815 A1 | 10/2008 | Jazra et al. |
| 2008/0289025 A1 | 11/2008 | Schneider |
| 2008/0320607 A1 | 12/2008 | Richardson |
| 2009/0019536 A1 | 1/2009 | Green et al. |
| 2009/0083730 A1 | 3/2009 | Richardson |
| 2009/0083833 A1 | 3/2009 | Ziola et al. |
| 2009/0089869 A1 | 4/2009 | Varghese |
| 2009/0113088 A1 | 4/2009 | Illowsky et al. |
| 2009/0132813 A1 | 5/2009 | Schibuk |
| 2009/0138643 A1 | 5/2009 | Charles et al. |
| 2009/0138975 A1 | 5/2009 | Richardson |
| 2009/0150674 A1 | 6/2009 | Richardson et al. |
| 2009/0198618 A1 | 8/2009 | Chan et al. |
| 2009/0271851 A1 | 10/2009 | Hoppe et al. |
| 2009/0292816 A1 | 11/2009 | Etchegoyen et al. |
| 2009/0300744 A1 | 12/2009 | Guo et al. |
| 2010/0037062 A1* | 2/2010 | Carney ......................... 713/176 |
| 2010/0197293 A1 | 8/2010 | Shem-Tov |
| 2010/0306038 A1 | 12/2010 | Harris |
| 2011/0093943 A1 | 4/2011 | Nakagawa et al. |
| 2011/0271109 A1 | 11/2011 | Schilling et al. |
| 2012/0030771 A1 | 2/2012 | Pierson et al. |

FOREIGN PATENT DOCUMENTS

| | | |
|---|---|---|
| EP | 1 637 958 | 3/2006 |
| EP | 1 637 961 | 3/2006 |
| EP | 1 670 188 | 6/2006 |
| EP | 1 912 413 | 4/2008 |
| EP | 2 267 629 | 12/2010 |
| EP | 2 270 737 | 1/2011 |
| EP | 2 273 438 | 1/2011 |
| GB | 2355322 | 4/2001 |
| WO | WO 92/09160 | 5/1992 |
| WO | WO 92/20022 | 11/1992 |
| WO | WO 93/01550 | 1/1993 |
| WO | WO 95/35533 | 12/1995 |
| WO | WO 00/58895 | 10/2000 |
| WO | WO 00/67095 | 11/2000 |
| WO | WO 01/90892 | 11/2001 |
| WO | WO 03/032126 | 4/2003 |
| WO | WO 2004/054196 | 6/2004 |
| WO | WO 2005/094544 | 10/2005 |
| WO | WO 2005/104686 | 11/2005 |
| WO | WO 2006/089352 | 8/2006 |
| WO | WO 2006/138393 | 12/2006 |
| WO | WO 2007/060516 | 5/2007 |
| WO | WO 2007/022134 | 7/2007 |
| WO | WO 2008/013504 | 1/2008 |
| WO | WO 2008/052310 | 5/2008 |
| WO | WO 2008/118074 | 10/2008 |
| WO | WO 2008/127431 | 10/2008 |
| WO | WO 2008/157639 | 12/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |
| WO | WO 2009/143115 | 11/2009 |
| WO | WO 2009/158525 | 12/2009 |
| WO | WO 2010/093683 | 8/2010 |

OTHER PUBLICATIONS

"Technical Details on Microsoft Product Activation for Windows XP," Internet Citation, XP002398930, Aug. 13, 2001.

Angha et al.; "Securing Transportation Network Infrastructure with Patented Technology of Device Locking—Developed by Uniloc USA", http://www.dkassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.

Johnson et al. "Dimensions of Online Behavior: Toward a User Typology," *Cyberpsycology and Behavior*, vol. 10, No. 6, pp. 773-779, 2007. XP002317349.

Klein, M., "How to Use a Loyalty Analysis," *Loyalty Builders*, pp. 1-6, 2003. XP002617371.

Lee P, "Oracle Adaptive Access Manager Reference Guide, Release 10g (10.1.4.5)," May 2009, Internet Article retrieved on Sep. 27, 2010. XP002603489.

Wikipedia: "Device Fingerprint," May 5, 2009, Internet Article retrieved on Sep. 28, 2010. XP002603492.

Williams et al., "Web Database Applications with PHP & MySQL," *O'Reilly Media Chapter 1. Database Applications and the Web* Mar. 2002, Internet Article retrieved on Sep. 21, 2010. XP002603488.

Williams, R., "A Painless Guide to CRC Error Detection Algorithms," Aug. 13, 1993, 33 pages, www.ross.net/crc/download/crc_v3.txt.

"Canon User Manual—Nikon Coolpix S52/S52c," Apr. 21, 2008, entire manual.

David J-L, "Cookieless Data Persistence in Possible," Apr. 23, 2003, Internet Article retrieved on Sep. 21, 2010. XP002603490.

Jensen et al., "Assigning and Enforcing Security Policies on Handheld Devices," 2002, 8 pages.

Johnson et al. "Dynamic Source Routing in Ad Hoc Wireless Networks," *Mobile Computing*, Kluwer Academic Publishers, 1996.

Wikipedia: "Software Extension," May 28, 2009, Internet Article retrieved on Oct. 11, 2010. XP002604710.

Iovation, "Using Reputation of Devices to Detect and Prevent Online Retail Fraud," *White Paper*, Apr. 2007.

Iovation, "Controlling High Fraud Risk of International Transactions," *Iovation Reputation Services, White Paper*, May 2007.

Posting from Slashdot on the article "Smart Cards for Windows XP Login" Comment "Re: PIN" posted Dec. 3, 2001. http://en.wikipedia.org/w/index.php?title=Two-factor_authentication&ildid=216794321.

Ohno, IEEE Symposium on Security and Privacy 2005, Journal Article.

* cited by examiner

AUTHENTICATION OF COMPUTING AND COMMUNICATIONS HARDWARE

This application claims priority to U.S. Provisional Application No. 61/252,521 which was filed Oct. 16, 2009 and which is fully incorporated herein by reference.

BACKGROUND

1. Field of the Invention

The present disclosure relates to methods and systems for authenticating and tracking use of computing and communications hardware.

2. Description of Related Art

Manufacturers, sellers, or licensors of computers, computer hardware, or computer-related communications hardware may sometimes desire to restrict or track use of such devices or hardware subsequent to sale or license to another party. For example, a manufacturer or distributor of computer or computer-related equipment may adopt a regional distribution strategy under which similar or identical products are sold in several regions at different prices or at different times determined by the region in which the product is sold. Such regional distribution strategies may create an incentive for downstream distributors in one region to export and resell the product in another region where the product is higher priced or not available. Products that are thusly re-exported are sometimes called "gray market" goods. Gray market goods may be deleterious to the commercial interests of the original source that adopted the regional distribution strategy, particularly when the exports involve altering configuration of gray market hardware to a state that the manufacturer does not support or that is not optimal for other reasons. In such cases, the gray market hardware may experience degradation of performance or even failure when operated in the altered configuration, which the consumer may unfairly attribute to poor quality, design, or support by the manufacturer. For further example, a manufacturer or distributor of computer or computer-related equipment may desire to track configuration changes of hardware after it is sold or distributed for technical support, design cycle planning, marketing, or other purposes.

It would be desirable, therefore, to provide systems and methods for authenticating and tracking use of computing and communications hardware for various applications, while enabling efficient identification and tracking of post-manufacture hardware configuration changes.

SUMMARY

The present technology uses a digital hardware fingerprint in conjunction with a serial number or other assigned hardware identifier and a remote database to authenticate and track distribution and use of computing and communications hardware configured for communicating over a communications network. These elements may be implemented at the client level, server level, or a mixture of client and server levels in various combinations, some examples of which are provided by the illustrative embodiments disclosed herein.

Initially, hardware to be tracked is fingerprinted at an entry control point to a distribution network. To "fingerprint" hardware, as used herein, refers to collecting characteristic data from a complex electronic hardware component, and processing the characteristic data to provide a stable signature that is characteristic of the component; i.e., capable of being reproduced at a later time by re-analyzing the component. The hardware component typically includes at least one processor, and several ancillary devices in communication with the processor. An "entry control point" refers to any definite point (e.g., a post-manufacture event) in a supply chain where it is desired to begin tracking hardware configuration; for example, after the hardware component is manufactured and before it is packaged for shipment to the first distributor in the supply chain.

The hardware fingerprint may be obtained at the entry control point by communicating with the processor of the hardware component using an external computer, executing software or firmware installed on the hardware, or some combination of the foregoing, to read characteristic data pertaining to devices making up the hardware component. Characteristic data may include, for example, serial numbers, version numbers, dates, and other data from hardware, software or firmware installed on one or more hardware components. The gathered data may be further processed to provide a data signature—i.e., the "fingerprint"—that is characteristic of the component and can be regenerated from the hardware component using a fingerprinting algorithm at a later time.

The fingerprint data collected may be stored using a data server or other data storage device capable of being accessed by a server that the hardware being tracked is designed to connect to via a communication network or networks. This server configuration enables automatic on-line operation of authenticity checking. In the alternative, the server may be operated on a stand-alone mode, i.e., not be configured to connect the tracked hardware, for embodiments in which authenticity checks are performed manually or in batch mode. Stand-alone server embodiments may be useful for checking authenticity of installed hardware by enterprises or individuals, to certify compliance, or for trouble-shooting. In stand-alone embodiments, hardware identifier/machine fingerprint pairs may be collected by end users or system administrators and manually transmitted to an administrator for the data server, for example, the hardware manufacturer, for checking against fingerprint data stored on the server.

In other embodiments, fingerprint and machine identifier data may be stored in non-server data storage systems, for example, a peer-to-peer system operated over a network connecting multiple hardware devices. In such a system, each registered hardware device may function both as a client and a server. As a client, each hardware device may register its fingerprint and identifier with one or more peer devices, during a controlled registration process such as may be conducted by an authorized party at an entry control point. As a server, each hardware device may store registration information from peer devices and respond to queries with stored registration data or data comparison results.

Whatever the configuration of the data server or data storage system, each hardware fingerprint may be stored in association with a unique machine identifier, for example, a serial number, assigned to the component from which the fingerprint was taken. For example, the fingerprint and machine identifier may be stored in related fields of a database record or data table. The machine identifier may be written to a defined location or file in a non-volatile memory of the hardware component to which the identifier is assigned. Optionally, the machine identifier may be encrypted or otherwise secured using a private encryption key, prior to being stored in the non-volatile memory.

In addition, each hardware component may be provided with an application in hardware or firmware configured to cause the component to send a defined data signal to a designated address of the communication network in response to a predefined sensor or clock signal indicating occurrence of a selected event. For example, the hardware component may be configured to transmit a data signal including the machine identifier to a designated address whenever the hardware component is powered up, at a designated time of day, day of the week or date, in response to an externally-originating signal, or some combination of the foregoing. The data signal may include additional information, for example, date and time, registered operator information, and geographic location information, to the extent available and desired.

The hardware component, operating in this context as a client, may also provide its machine fingerprint to the designated address, in or in association with the data signal. The machine fingerprint should be freshly determined on the client component at a time relatively close to, or contemporaneously with, transmission of the data signal from the client to the designated server address. In some embodiments, the client may execute a software or firmware algorithm to determine the machine fingerprint in response to the predefined sensor or clock signal indicating occurrence of the selected event. In the alternative, or in addition, the client may determine the machine fingerprint after transmitting the data signal to the server, in response to a return signal from the server requesting a machine fingerprint, or in response to some other event.

Subsequent to distribution from the entry control point, each hardware component therefore provides a data signal to the designated address. Sending of the data signal may be triggered by any predetermined event, for example, operation of the machine to perform any function that is designated as a trigger, powering the machine up or booting the machine up, or passage of a designated date, time of day, or date/time point. A server or other system component may be configured to receive the data signals from numerous distributed hardware components, and respond to the data signals according to a defined algorithm. The target server may decrypt the machine identifier in the data signal, look up machine parameters using the identifier, and respond to the data signal in different ways selected according to the machine parameters and metadata included in the data signal, if any. For example, if the data signal includes a time/date stamp, the server may determine that no response is needed to the data signal if a response has been provided within a sufficiently recent period, and merely record the relevant parameters provided by the signal. On the other hand, if the parameters indicate that a response should be provided to the signal, the server may transmit a signal requesting a machine fingerprint to the client that originated the data signal. In some embodiments, the server may also transmit an application configured for generating the machine fingerprint to the client. The application may comprise one or more executable files, which may be configured to operate in cooperation with a corresponding application on the server, or in the alternative, to operate independently of the server.

According to the foregoing, the server therefore receives from time to time data pairs each consisting of an assigned machine identifier and a freshly generated machine fingerprint, for each client machine in a population of numerous distributed clients. Once in possession of this data, the server compares the recently received fingerprint with stored fingerprint data located using the associated identifier to determine whether particular clients have undergone hardware configuration changes. For example, for a particular machine identifier matching a database record, a match between the stored fingerprint and the recently generated fingerprint can be interpreted as an indication that the client machine to which the identifier belongs has not experienced any hardware configuration changes likely to be of concern or considered critical. What changes are "likely to be of concern" or considered critical may depend on the configuration of the machine fingerprint and the method by which it is generated, further details of which are provided in the detailed description below. Conversely, if the two fingerprints for the identified machine do not exactly match, this may be taken as an indication of configuration changes initiating responsive action of some kind.

Responsive action may consist of recording data for tracking purposes, or may include other activities such as, for example, preventing access by the client machine to support resources, directing appropriate resources to reconfigured machines, or automatically disabling machines that report mismatching fingerprints. For example, if a configuration change indicates that a particular client is a gray market device, it may be flagged as such at the server level and prevented from access to certain updates or content services. For further example, the server may use information obtained by comparing the original fingerprint to a more recent fingerprint to direct appropriately configured software updates to the reconfigured clients, thereby preventing service degradation or failures. In some embodiments, receipt of known serial number coupled with a matching fingerprint and one or more mismatching fingerprint from machines in the field may indicate use of a stolen serial number on the machines supplying the mismatching fingerprints. In such cases, an appropriate responsive action may be to cause the machines with mismatching fingerprints to be disabled. The foregoing examples merely illustrate certain advantages of the technology described herein, and should not be construed as limiting the uses to which the technology may be applied.

A more complete understanding of the system and method for authenticating and tracking configuration changes in distributed hardware components and devices will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

Throughout the several figures and in the specification that follows, like element numerals are used to indicate like elements appearing in one or more of the figures.

DETAILED DESCRIPTION

The present technology provides for authenticating and tracking configuration changes in distributed hardware components and devices, using hardware fingerprinting.

Figure 1:
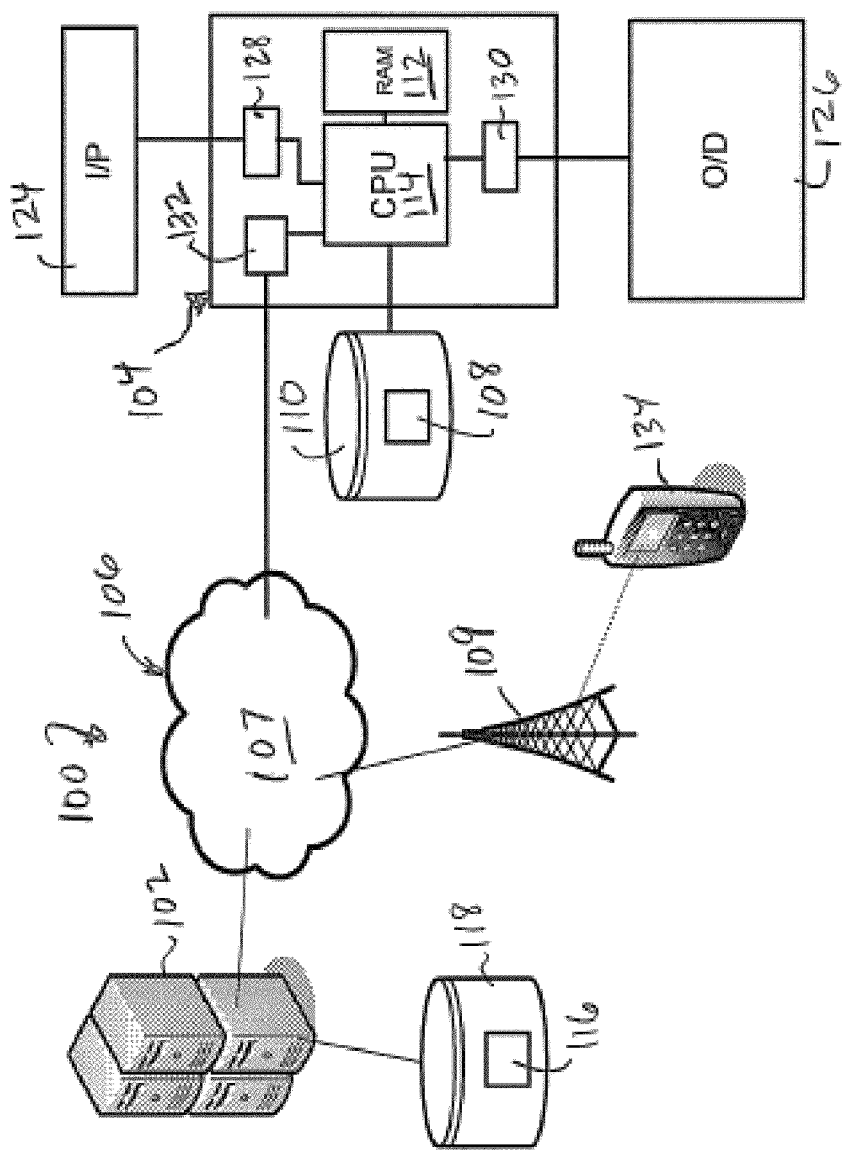
FIG. 1 is a schematic diagram showing elements of one embodiment of a system according to the invention for authenticating and tracking configuration changes in distributed hardware components and devices.

FIG. 1 shows a system 100 including a server 102 and client devices 104, 134 in communication via a communications network 106 or other signal-bearing medium. Communications network 106 may comprise the Internet 107, a cellular communications network 109, a satellite communications network (not shown), a local area network (not shown), or some combination of these or other suitable networks. The client device may be configured with a software executable file or files 108 encoded in a computer-readable media of a data storage device 110. When loaded into the client memory 112 and subsequently into the client processor 114, the executable file or files causes the client device to perform the client-side processes and outputs as described in more detail herein. Examples of suitable devices for use as client device 104 include personal computers, network appliances, routers, programmable communications devices such as mobile telephones and media players, "netbooks," and other programmable devices.

Similarly, the server 102 may be configured with a server-side application file or files 116 encoded in a computer-readable media of a data storage device 118. When loaded into the server memory and subsequently into a processor of the server, the executable file or files causes the server to perform the server-side processes and outputs as described in more detail herein. File or files 108 and 116 may be developed by writing programming code in any suitable programming language to perform the actions and provide the outputs consistent with the disclosure herein, and compiling the code to provide machine-executable code. Like the client device 104, the server 102 may comprise any one of various suitable programmable computing devices. In the alternative, server 102 may comprise a coordinated assembly of such computing devices, for example, a server farm. In another alternative, the function of the server 102 may be performed by a peer-to-peer network of clients 104, 134, or any other system suitable for storage and retrieval of electronic data.

Generally, the clients 104, 134 may be configured as input-transforming machines, an essential purpose of which is to receive physical input from at least one client-side user input device 124 and provide a responsive physical output via a client-side output device 126, such as an audio-video output. Input device 124 may comprise various devices, for example, a keyboard, mouse, microphone, or other physical transducer connected to client 104 and configured to transform physical input from a user into a data signal, which may be routed through an interface device 128 and provided as input to processor 114. The processor 114, operating an executable as described herein, responds to the input signal and provides output data through a video interface 130 to a display device 126. The processor 114 may further receive input data from the server 102 or provide output to the server via network interface 132 and communications network 106. Client 134 may include similar elements in a mobile form factor communicating wirelessly with network 106, for example, via a cellular communications network.

Figure 2:
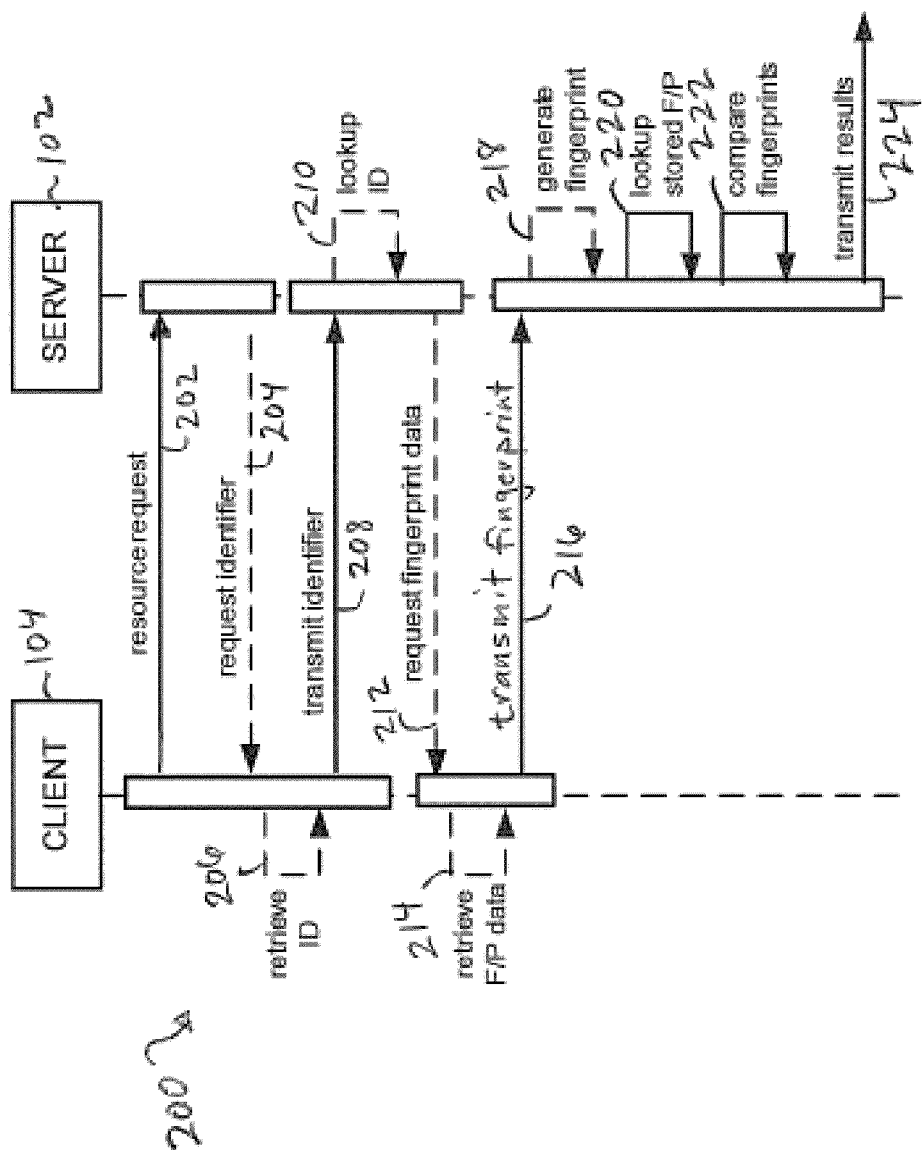
FIG. 2 is a sequence diagram showing an embodiment of the invention for authenticating and tracking configuration changes in distributed hardware components and devices.

FIG. 2 is a sequence diagram that exemplifies an interactive process 200 such as may occur between a server 102 and client 104. In general, it should be appreciated that the functions of the server 102 may be performed by other suitable storage and retrieval systems for electronic data, some examples of which are provided herein. The diagram shows an automated process in which user interaction is not required; the process may be adapted to respond to input from one or more input devices, as well, for example to enable manual or batch processing of hardware registration information. The process may be initiated 202 by any event, for example a communication from the client device, such as a resource request. For further example, the communication may consist essential of a ping or "here I am" signal generated automatically when the client boots up or connects to a network, or in response to any other predetermined event. Whatever the form or timing of the communication signal, the server may be configured to respond 204 by requesting a machine identifier from the client device. In the alternative, the initiating communication 202 may include or accompany the machine identifier as data.

In response to the request 204, or prior to the initiating communication 202, the client should retrieve a machine identifier 206 from a local memory. The machine identifier may comprise a string of characters, for example, a serial number, assigned as a unique identifier for the machine at the time of manufacture or initial configuration. The identifier may be stored in any suitable non-volatile memory location accessible to the client processor. It may be advantageous to store the identifier in a non-removable memory device that cannot readily be removed and used in another machine. To discourage copying of the identifier for counterfeiting, the identifier may be obfuscated, encrypted, or otherwise protected.

The client may transmit 208 the identifier to the server. In response, the server may lookup the identifier 210 in a local or remote data component, such as, for example, by communicating a query to a database server holding a database of identifiers stored in association with information about the identified machines, including but not limited to machine fingerprints. The stored machine fingerprints are determined at an earlier time and stored in the database, for example at a time immediately after manufacture or configuration, or prior to distribution. The database or other data table (not shown) may in response return the stored machine fingerprint and other associated information to the server 102.

The server may request current fingerprint data 212 from the client. Various methods and means for obtaining current fingerprint data are described later in the specification. In response, the client may execute an application for retrieving the requested fingerprint data 214 and transmit 216 the current fingerprint data to the server 102.

Optionally, the server may generate a current fingerprint 218 using the fingerprint data from the client as input. In the alternative, the client may generate the fingerprint (not shown) and transmit to the server. Either way, after obtaining the current fingerprint, the server retrieves the stored fingerprint 220 and performs a comparison 222 between the stored and current fingerprints for client 104. If the client configuration has not changed in any critical way since the stored fingerprint was generated, the current fingerprint will match the stored fingerprint, and this result may be transmitted by the server 224 to any component or resource having a use for the information. Such uses may include, for example, detecting counterfeit machines or unauthorized configuration changes, or tracking critical configuration changes. Conversely, if the stored fingerprint does not match the current fingerprint, the server may report the non-match result 224. In addition, the server may determine the nature or quality of the configuration change based on the fingerprint comparison. For example, the server may be able to determine, based on the comparison, that all parameters making up the fingerprint are unchanged except for one or a few specific parameters, and identify what the changed parameters are. The server may also discover recent records indicating that the identifier is counterfeit, for example, records with the same identifier but different fingerprints. Depending on the circumstances, a counterfeit or stolen identifier may be detected. For example, a record of an identifier/fingerprint pair matching the baseline fingerprint that is dated after a record that does not match the baseline fingerprint indicates that the earlier record probably came from a device with a counterfeit or stolen identifier.

In some embodiments, fingerprint checking may be performed off-line, that is, without direct interactions between the clients and a data storage server or system. For example, an organization or individual may collect machine identifier and fingerprint data for client hardware within the organization's or individual's control. The organization or individual may then transmit collected identifier/fingerprint pairs to a data service to discover whether or not the clients from which the data pairs were collected are authentic. In such embodiments, the organization or individual controlling the clients may use off-line communications to avoid the need for direct communication access between the clients and the data service, for security or other reasons.

Figure 3:
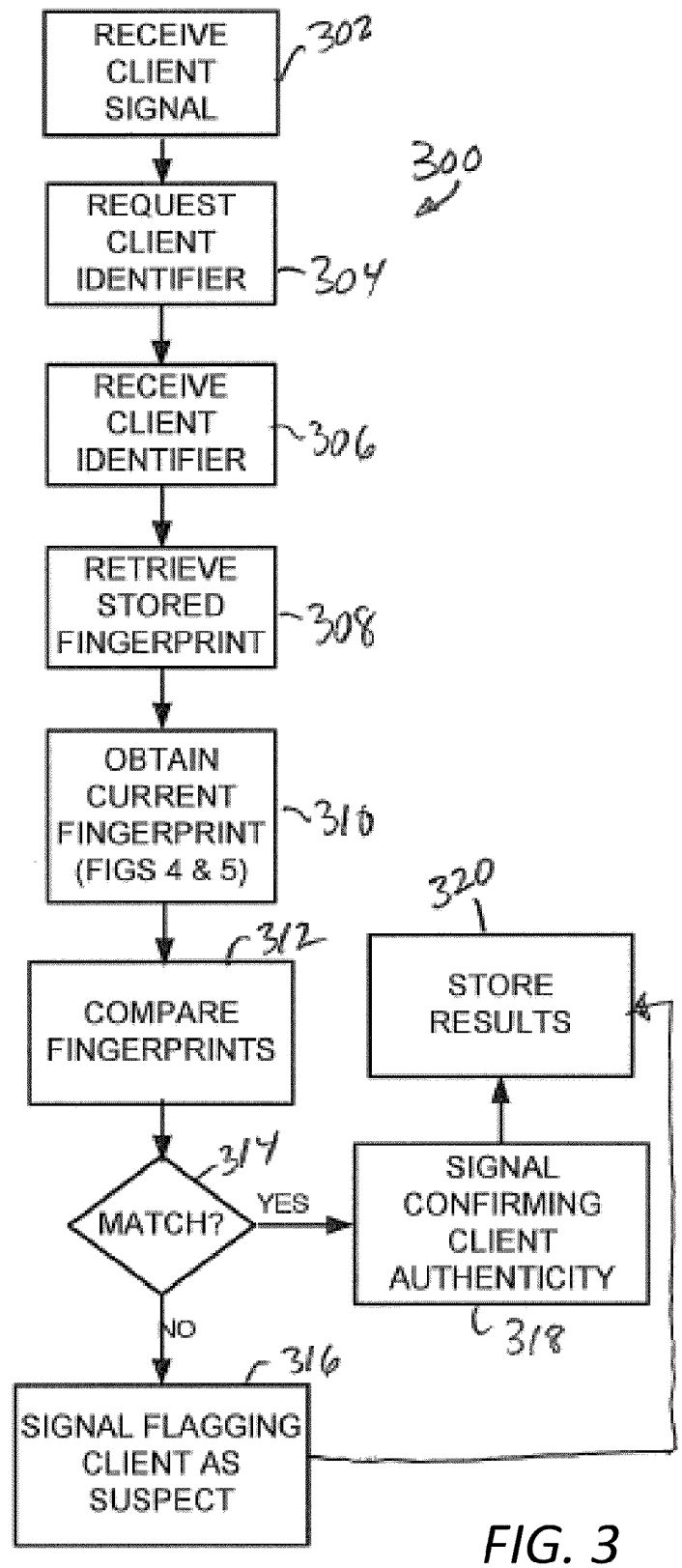
FIG. 3 is a flow chart showing an embodiment of a method according to the invention for authenticating and tracking configuration changes in distributed hardware components and devices.

In accordance with the foregoing, FIG. 3 shows an example of a method 300 for authenticating and tracking configuration changes in distributed hardware components and devices. A server receives the predetermined initiating signal from a client at 302, and in response, may request the client identifier at 304. At 306, the server receives the client identifier associated with the initiating signal, either in the initiating signal itself, or in a communication to a responsive query from the server. At some convenient time after receiving the identifier, the server may retrieve the stored fingerprint 308.

Figure 4:
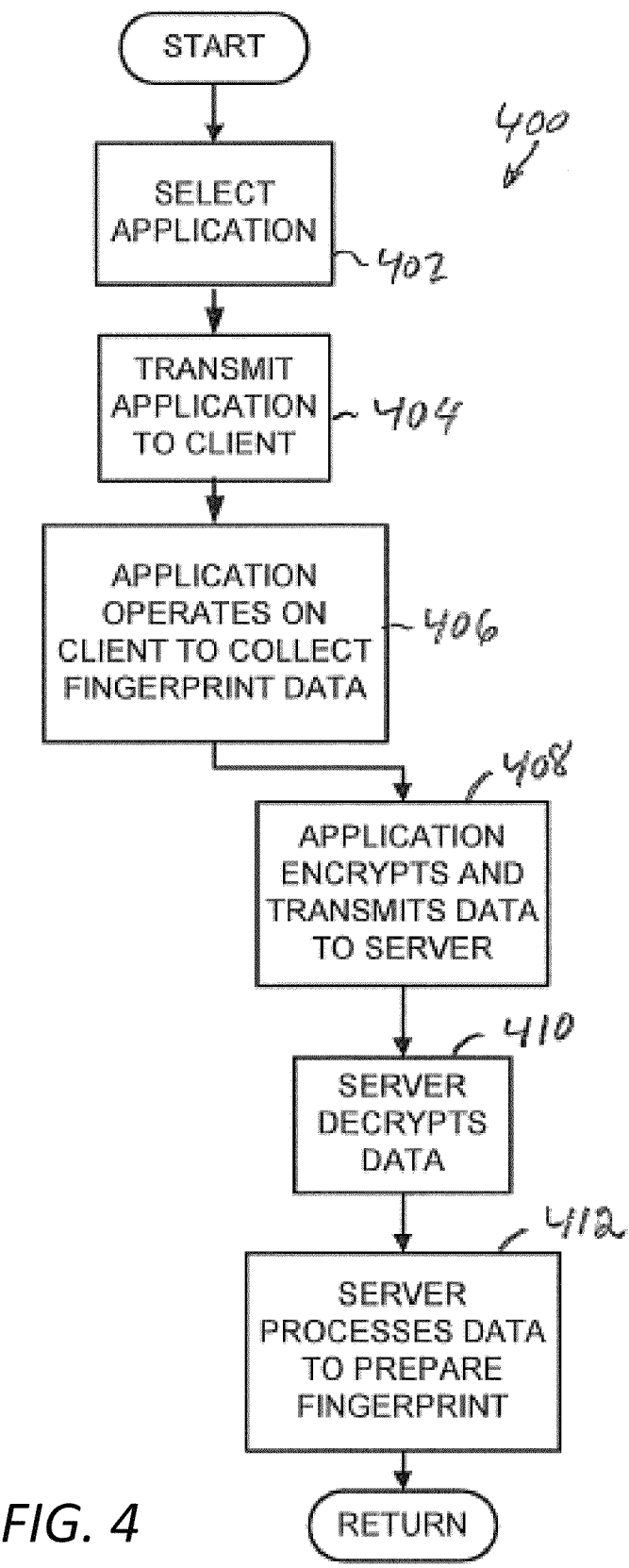
FIG. 4 is a process flow chart showing one embodiment of a method according to the invention for obtaining a current fingerprint of a remote hardware component or device.
Figure 5:
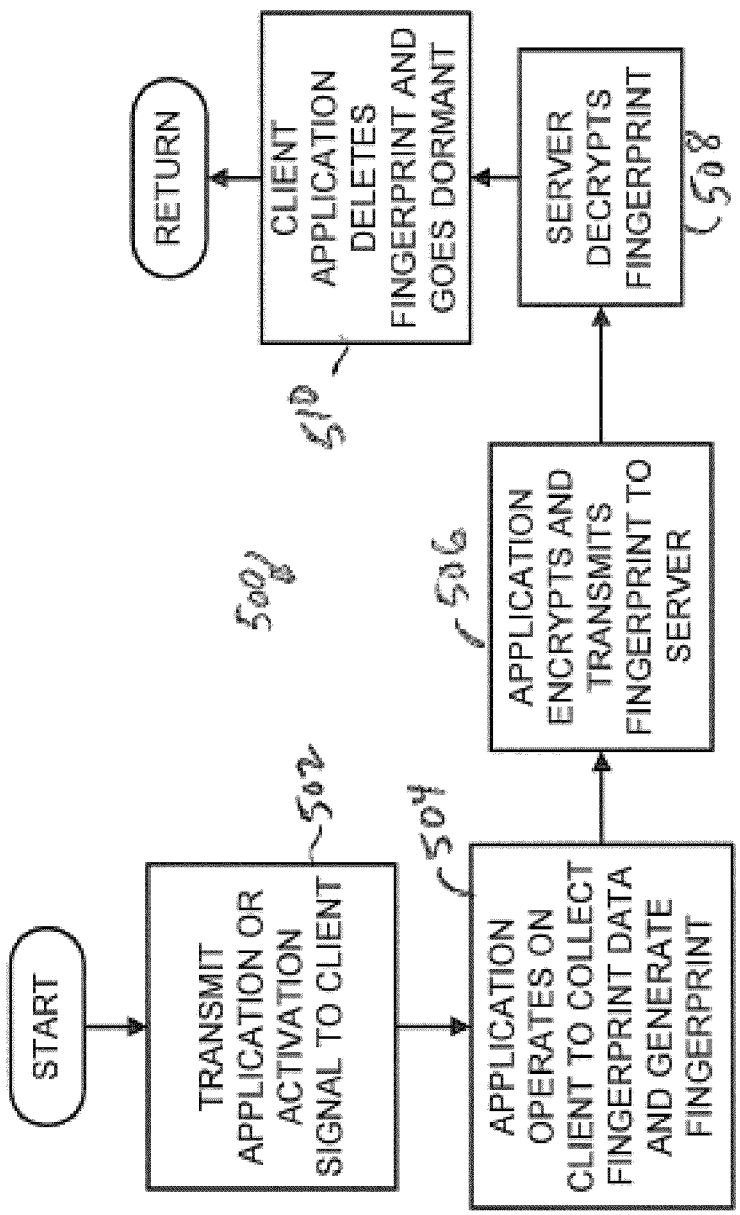
FIG. 5 is a process flow chart showing another embodiment of a method according to the invention for obtaining a current fingerprint of a remote hardware component or device.

According to a process described more fully in connection with FIG. 4 or 5, the server obtains a current fingerprint 310 in association with the client machine identifier. For example, the initiating signal received at 302 may include the current machine fingerprint generated automatically on the client just prior to the communication. However in the embodiments primarily disclosed herein, the current fingerprint is obtained using a later process responsive to the initial communication from the client.

At 312, the server may compare the current fingerprint to the stored fingerprint. If the fingerprints do not match, the server may provide a signal 316 to any other component or process. The signal may operate to flag the client as suspect for further investigation, temporarily or permanently bar the client from access to a designated resource or component, be used merely for tracking purposes, or for any other use. In some embodiments, the signal may operate to wholly or partially disable operation of the hardware device via a self-disablement function programmed in software or firmware for the device. The signal at 316 may also indicate how the configuration of the fingerprinted client has changed, based on the comparison. If the fingerprints do match 314, the server may provide a signal indicating this to any other resource or component, which may confirm the authenticity and/or stable configuration of the client, for any desired use. The server may also store the comparison results 320 in a local or remote data storage component for future reference.

FIGS. 4 and 5 are flow charts showing examples of methods 400, 500 for obtaining a current fingerprint of a remote hardware component or device. The present technology is not limited by these examples. In some embodiments as shown in FIG. 4, the server may select an application 402 configured to compute a machine fingerprint for the particular type of client indicated by the identifier received at 306. The server may be configured to authenticate various different types of hardware and may therefore be configured with different fingerprint-generating applications. The server may select and transmit the application to the client 404 in response to a predetermined triggering event. Examples of triggering events include a communication event wherein the client transmits a predetermined signal or data to the server or to some other device in communication with the server, date/time events, or server-initiated events (e.g., receiving an authorized audit request).

The application may be configured to operate automatically on the client 406 to collect fingerprint data. Specific examples of fingerprint data are provided later in the specification. Data may be collected for critical components of the client. The application may also gather data for non-critical components to obscure the critical data. During or after collecting the fingerprint data for which it is programmed, the application may encrypt the data and transmit it to the server 408. The server decrypts the data 410 and processes it to prepare the fingerprint 412. Examples of such processing are described later in the specification. The processing may include, for example, discarding data collected for non-critical components, organizing the collected data, truncation, and/or applying a hash and/or other transformation.

According to an alternative embodiment 500 as shown in FIG. 5, a fingerprint-generating application operates on the client to prepare the current fingerprint. The application may be transmitted to the client by the server 502, or be pre-installed on the client and activated by the server or self-activated. The application may be triggered by any desired predetermined event, for example, booting up or powering up the device, use of the device to perform a routine defined as a trigger event, or the system clock indicating a particular date or time. The application operates on the client to collect fingerprint data and generate a current fingerprint 504. After generating the fingerprint, the application may encrypt the current fingerprint and transmit to the server 506. The server may decrypt the fingerprint 508 for use in method 300. Subsequently the client fingerprint-generating application may delete the current fingerprint from all system memory locations and go dormant. To "go dormant" here refers to inactivating itself, which may merely involve termination but in more sophisticated embodiments may also include locking or inactivating itself after termination. For example, as part of a termination procedure the application may delete a key required to execute the application from all client memory locations. After the key deletion, the application cannot be executed until the key is supplied from another source, such as from the authorized server. The client application discussed in FIG. 4 may similarly inactivate itself after generating the current key.

In both methods 400 and 500, to generate the fingerprint data the client device under control of the fingerprint application first reads local system component parameter information according to a predefined algorithm to generate a data file. The parameters checked to generate the fingerprint may include, for example, hard disk volume name, computer name, hard disc initialization date, amount of installed memory, type of processor, software or operating system serial number, or unique parameters associated with firmware installed in the client device. In general, the collected parameter information should be of a time-stable or static nature for the client, and used as input to an algorithm for generating a specific data file. The resulting data file, also referred to herein as "fingerprint data," may be stored in a file in a memory of the client. Fingerprint data is described more detail below, and signifies data that is characteristic of hardware or firmware belonging to the client device, collected and assembled to have a very high probability (e.g., greater than 99.999%) of being unique to the client. It may be advantageous to store the fingerprint file in a transient file only, such as in a random-access memory (RAM) device, so that no record of the file remains after the fingerprint is generated. The stored data file comprises parameter data arranged in a defined order of data fields or records. Each data field may be of a known length, which may vary for each field. The fingerprint data file may be encrypted, secured or obfuscated using any suitable method. The client may transmit the entire fingerprint data file to a trusted server after it is first generated.

In the alternative, the client may transmit only a selected portion of the fingerprint data to the server. In such alternative cases, the client may request information from a trusted source for defining a sampling protocol, i.e., a data template, for deriving a portion from the fingerprint data to generate a client machine identifier. The sample-defining template may comprise information defining a filter or other transformation to be applied to the original fingerprint data file to generate a device fingerprint. In some embodiments, the template defines a map for selecting designated portions of the fingerprint data file. For example, the template may specify one or more bytes of data, but less than all data, be selected from each data field in a particular order or position. In these embodiments, the client may process the fingerprint data using the sample-defining template to generate a resulting working machine fingerprint, which may be stored in a local buffering system. The client, the source of the sample-defining template, or both may store the sample-defining information in a secure file for future reference, optionally first encrypting it. The client may then provide the machine fingerprint to the server or any other device that needs the fingerprint to identify or authenticate the client device.

In some embodiments, a trusted server maintains a record of the entire fingerprint data for the client, while the sample-defining template used to generate a working machine fingerprint is discarded after each use. The server may generate the sample-defining template and confirm that the machine fingerprint generated by the client is consistent with both the fingerprint data and with the sample-defining template. By specifying different sample-defining template at different times, the server may thereby authenticate the client without requiring the client to transmit the entirety of the fingerprint data for each authentication instance. Instead, the entire fingerprint data may provided from the client to the server during a single initialization session, which may be initiated and secured by the server using appropriate security tools, if it is transmitted at all. Subsequent sessions need not be as secure because the entirety of the fingerprint data is not retransmitted. The utility of the client's machine fingerprint for authentication of device identity may be thereby maintained in a more secure form.

Figure 6:
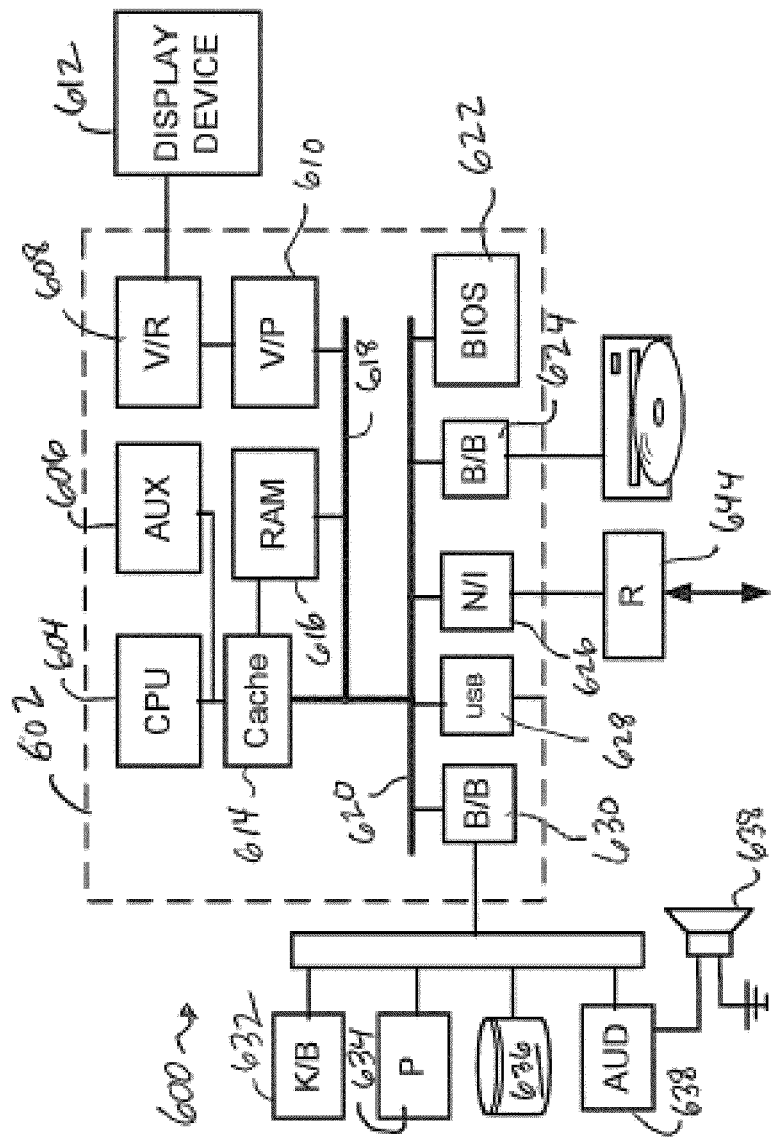
FIG. 6 is a block diagram showing an embodiment of a client device and component for fingerprinting according to the invention.

An example of a client device 600 comprising multiple components that may provide input for a gross fingerprint is shown in FIG. 6. Client 600 is depicted by way of example only, and does not limit the configuration of a client device on which hardware fingerprinting may usefully be performed. Client 600 may comprise a motherboard 602 on which reside a CPU 604 and one or more auxiliary processors 606. The CPU may comprise a cache memory 614 in communication with a random access memory (RAM) 616. A video processor 610 may communicate with these components via Northbridge hub 618 and provide video data through video RAM 608 to a display device 612.

Other components may communicate with the CPU 604 via a Southbridge hub 620, such as, for example a BIOS read-only memory or flash memory device 622, one or more bus bridges 624, 630, a network interface device 626, and a serial port 628. Each of these and other components may be characterized by some data or parameter settings that may be collected using the CPU 604 and used to characterize the client device 600. In addition, the client may be connected to various peripheral devices. For example, client 600 may be connected to a keyboard 632, a pointing device 634, a data storage device 636, and an audio output device 638 for transforming a data signal into analog audio output for a speaker 640 or amplifier (not shown). Other peripheral devices may include a router 644 connected via network interface 626 and providing connectivity to the Internet or other network, which may comprise a means for receiving applications or data from a server, or communicating with a server. Some clients may also include a media reader 646 for portable media 648, which may comprise a means for receiving an application capable of performing methods and processes disclosed herein.

Although client device 600 is shown with components as may often be found in personal computers, the technology disclosed herein may readily be implemented on more clients of other types having programmable processors, memories and means for communicating with a server, and generally having components with non-user-configurable settings that may be used in compiling a device fingerprint. Examples of integrated portable clients include network appliances, routers, servers, application-capable mobile phones, media player devices, personal organizers, and netbooks.

Illustrative examples of various machine parameters that may be accessible to an application or applications running on or interacting with a processor of the client machine to generate fingerprint data may include, for example: machine model; machine serial number; machine copyright; machine ROM version; machine bus speed; machine details; machine manufacturer; machine ROM release date; machine ROM size; machine UUID; and machine service tag. For further example, these machine parameters may include: CPU ID; CPU model; CPU details; CPU actual speed; CPU family; CPU manufacturer; CPU voltage; and CPU external clock; memory model; memory slots; memory total; and memory details; video card or component model; video card or component details; display model; display details; audio model; and audio details; network model; network address; Bluetooth address; hard disk drive model; hard disk drive serial number; hard disk drive configuration details; hard disk drive damage map; hard disk drive volume name; NetStore details; and NetStore volume name; optical drive model; optical drive serial; optical details; keyboard model; keyboard details; mouse model; mouse details; printer details; and scanner details; baseboard manufacturer; baseboard product name; baseboard version; baseboard serial number; and baseboard asset tag; chassis manufacturer; chassis type; chassis version; and chassis serial number; IDE controller; SATA controller; RAID controller; and SCSI controller; port connector designator; port connector type; port connector port type; and system slot type; cache level; cache size; cache max size; cache SRAM type; and cache error correction type; fan; PCMCIA; modem; portable battery; tape drive; USB controller; and USB hub; device model; device model IMEI; device model IMSI; and device model LCD; wireless 802.11; webcam; game controller; silicone serial; and PCI controller; machine model, processor model, processor details, processor speed, memory model, memory total, network model of each Ethernet interface, network MAC address of each Ethernet interface, dard disk drive model, hard disk drive serial identifier (e.g., using Dallas Silicone Serial DS-2401 chipset or the like), OS install date, nonce value, and nonce time of day. The foregoing examples are merely illustrative, and any suitable machine parameters may be used.

Because many client devices are mass-produced, using hardware parameters limited to the client box may not always provide the desired level of assurance that a fingerprint is unique to the client device. Use of user-configurable parameters may ameliorate this risk considerably, but increase the risk that the fingerprint may change over time. In addition, sampling of physical, non-user configurable properties for use as parameter input may also lessen the risk of generating duplicate fingerprint data. Physical device parameters available for sampling may include, for example, unique manufacturer characteristics, carbon and silicone degradation and small device failures.

Measuring carbon and silicone degradation may be accomplished, for example, by measuring a processor chip's performance in processing complex mathematical computations, or its speed in response to intensive time variable computations. These measurements depend in part on the speed with which electricity travels through the semi-conductor material from which the processor is fabricated. Using variable offsets to compensate for factors such as heat and additional stresses placed on a chip during the sampling process may allow measurements at different times to reproduce the expected values within a designated degree of precision. Over the lifetime of the processor, however, such measurements may change due to gradual degradation of the semi-conductor material. Recalibration or rewriting the fingerprint data may be used to compensate for such changes.

In addition to the chip benchmarking and degradation measurements, the process for generating a fingerprint data may include measuring physical, non-user-configurable characteristics of disk drives and solid state memory devices. For example, each data storage device may have damaged or unusable data sectors that are specific to each physical unit. A damaged or unusable sector generally remains so, and therefore a map of damaged sectors at a particular point in time may be used to identify a specific hardware device later in time. Data of this nature may also be included in a fingerprint file.

The fingerprint-generating application may read parameters from operating system data files or other data stored on the client, or actively obtain the parameters by querying one of more hardware components in communication with a processor on which the application is operating. A client processor provided with at least one application operating to gather the machine parameters may comprise a means for collecting and generating fingerprint data.

This process of generating a working machine fingerprint may include at least one irreversible transformation, such as, for example, a cryptographic hash function, such that the input machine parameters cannot be derived from the resulting fingerprint data. Each fingerprint data, to a very high degree of certainty, cannot be generated except by the suitably configured application operating or otherwise having had access to the same computing device for which the fingerprint data was first generated. Conversely, each fingerprint, again to a very high degree of certainty, can be successfully reproduced by the suitably configured application operating or otherwise having access to the same computing device on which the identifier was first generated.

Optionally, the client device may store the fingerprint in a local memory. However, in some embodiments the fingerprint is stored by the client device only temporarily to facilitate transmission to a server for use in the authentication process described herein. This approach may lessen the risk of the fingerprint data being discovered and used for an unauthorized purpose. In the alternative, or in addition, the client may transmit only a portion of the fingerprint data to the server, or transmit additional data with the fingerprint data used to generate a machine fingerprint. Either method may reduce the risk that fingerprint data will be somehow intercepted during or after transmission, and used for some unauthorized purpose.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented, unless a specific order is expressly described or is logically required.

Moreover, various aspects or features described herein can be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other computer-readable media for storing information. The term "computer-readable medium" may include, without being limited to, optical, magnetic, electronic, electro-magnetic and various other tangible media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method for authenticating a client device by executing encoded instructions configured to cause a computer to:
generate a current machine fingerprint for the client device comprising a processor and memory, at least in part by retrieving raw configuration data indicating current configuration states of hardware making up the client device and processing the data to generate the current machine fingerprint using less than an entirety of the raw configuration data retrieved from the hardware;
receive an identifier of the client device and from the client device through a computer network, wherein the identifier is separate from the current machine fingerprint;
use the identifier to obtain a previously generated and stored machine fingerprint associated with the identifier, wherein the stored machine fingerprint was generated using the entirety of the raw configuration data; and
provide an indication that the client device is authentic in response to determining that the current machine fingerprint matches the stored machine fingerprint;
wherein the current machine fingerprint matches the stored machine fingerprint if the configuration of the client device has not changed in any critical way since the stored fingerprint was generated.

2. The method of claim 1, further comprising generating the machine fingerprint further determined by current configuration states of software stored on the client device.

3. The method of claim 1, further comprising transmitting the identifier and the current machine fingerprint from the client device to a server for comparison to the stored machine fingerprint.

4. The method of claim 3, further comprising encrypting the current machine fingerprint before transmitting to the server.

5. The method of claim 1, wherein the current machine fingerprint is generated by a server in communication with the client device.

6. The method of claim 5, further comprising retrieving, using the server, raw configuration data from the client device for use in generating the current machine fingerprint.

7. The method of claim 6, further comprising transmitting an application from the server to the client, the application configured for retrieving the raw configuration data.

8. The method of claim 1, further comprising providing an indication that the client device is not authentic in response to determining that the current machine fingerprint does not match the stored machine fingerprint.

9. A method for authenticating a hardware component by executing encoded instructions configured to cause a computer to:
assign a unique identifier to the hardware component;
generate a baseline fingerprint for the hardware component using an algorithm processing an entirety of raw configuration data determined from the hardware component as input, wherein the baseline fingerprint is capable of being regenerated from the hardware component so long as configuration of the hardware component is not changed, wherein the baseline fingerprint is separate from the identifier;
transmit the identifier in association with the baseline fingerprint for storage in a computer-readable data structure; and
generate a data signal, in response to a query from the hardware component through a computer network and comprising the assigned identifier, indicating whether the stored baseline fingerprint for the assigned identifier matches a second fingerprint regenerated from the raw configuration data of the hardware component at a time after the baseline fingerprint is generated;
wherein the second fingerprint is generated using less than an entirety of the raw configuration data of the hardware component; and
wherein the stored baseline fingerprint matches the second fingerprint if the configuration of the hardware component has not changed in any critical way since the stored baseline fingerprint was generated.

10. The method of claim 9, further comprising serving an application from a server in response to the query, the application configured to regenerate the second fingerprint on the hardware component and cause transmission of the second fingerprint to the server.

11. The method of claim 10, wherein the application is further configured to delete the second fingerprint from the hardware component after the transmission of the second fingerprint and to go dormant.

12. The method of claim 9, further comprising retrieving raw configuration data from the hardware component for use in regenerating the second fingerprint, in response to the query.

13. The method of claim 12, further comprising regenerating the second fingerprint using less than an entirety of the determined raw configuration data retrieved from the hardware component.

14. The method of claim 13, further comprising transmitting an application from a server to the hardware component in response to the query, the application configured for retrieving the raw configuration data.

15. A non-transitory computer-readable medium encoded with instructions configured to cause a computer to:
generate a baseline fingerprint for a hardware component by processing an entirety of raw configuration data determined from the hardware component as input, wherein the baseline fingerprint is capable of being regenerated from the hardware component so long as configuration of the hardware component is not changed;
transmit the baseline fingerprint for storage in a computer-readable data structure in association with a unique identifier assigned to the hardware component, wherein the baseline fingerprint is separate from the identifier; and
generate a data signal, in response to a query from the hardware component through a computer network and comprising the assigned identifier, indicating whether the stored baseline fingerprint for the assigned identifier matches a second fingerprint regenerated from the hardware component subsequent to generation of the baseline fingerprint;
wherein the encoded instructions are further configured to cause the computer to retrieve raw configuration data from the hardware component for use in regenerating the second fingerprint;
wherein the encoded instructions are further configured to cause the computer to regenerate the second fingerprint using less than an entirety of the raw configuration data retrieved from the hardware component; and
wherein the stored baseline fingerprint matches the second fingerprint if the configuration of the hardware component has not changed in any critical way since the stored baseline fingerprint was generated.

16. The non-transitory computer-readable medium of claim 15, wherein the encoded instructions are further configured to cause a computer to serve an application from a server in response to the query, the application configured to regenerate the second fingerprint on the hardware component and cause transmission of the second fingerprint to the server.

17. The non-transitory computer-readable medium of claim 15, wherein the encoded instructions are further configured to cause a computer to transmit an application to the hardware component configured for retrieving the raw configuration data.

\* \* \* \* \*